US009228050B2

(12) United States Patent
Boday et al.

(10) Patent No.: US 9,228,050 B2
(45) Date of Patent: *Jan. 5, 2016

(54) VERSATILE, FACILE AND SCALABLE ROUTE TO POLYLACTIC ACID-BACKBONE GRAFT AND BOTTLEBRUSH COPOLYMERS

(71) Applicant: International Business Machines Corporation, Armonk, NY (US)

(72) Inventors: Dylan J. Boday, Tucson, AZ (US); Timothy C. Mauldin, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/525,130

(22) Filed: Oct. 27, 2014

(65) Prior Publication Data

US 2015/0284506 A1    Oct. 8, 2015

Related U.S. Application Data

(63) Continuation of application No. 14/243,191, filed on Apr. 2, 2014.

(51) Int. Cl.
| | |
|---|---|
| C08G 63/08 | (2006.01) |
| C08G 63/58 | (2006.01) |
| C08G 63/83 | (2006.01) |
| C08G 63/676 | (2006.01) |
| C08L 67/06 | (2006.01) |
| C08F 283/01 | (2006.01) |

(52) U.S. Cl.
CPC ................... *C08G 63/08* (2013.01)

(58) Field of Classification Search
CPC ........ C08G 63/08; C08G 63/58; C08G 63/83; C08G 63/553; C08G 63/676; C08G 63/918; C08L 67/06; C08F 283/01
USPC .............................. 525/333.3, 445
See application file for complete search history.

(56) References Cited

U.S. PATENT DOCUMENTS

| | | | |
|---|---|---|---|
| 5,922,832 A | 7/1999 | Randall et al. | |
| 5,952,433 A * | 9/1999 | Wang et al. ................. | 525/415 |
| 6,306,209 B1 | 10/2001 | Woodworth et al. | |
| 6,495,631 B1 | 12/2002 | Randall et al. | |
| 6,730,772 B2 | 5/2004 | Shastri | |
| 7,049,373 B2 | 5/2006 | Matyjaszewski et al. | |
| 7,053,151 B2 * | 5/2006 | Wang et al. ................. | 525/63 |
| 7,381,772 B2 | 6/2008 | Flexman et al. | |
| 7,491,438 B2 | 2/2009 | Demott et al. | |
| 7,531,585 B2 | 5/2009 | Ozawa et al. | |
| 7,807,745 B2 | 10/2010 | Agarwal et al. | |
| 7,863,382 B2 | 1/2011 | Ishii et al. | |
| 7,897,168 B2 | 3/2011 | Chen et al. | |
| 8,076,406 B2 | 12/2011 | Brule et al. | |
| 8,232,343 B2 | 7/2012 | Chung et al. | |
| 8,378,041 B2 | 2/2013 | Johnson et al. | |
| 8,445,593 B2 | 5/2013 | Ishii et al. | |
| 8,450,420 B2 | 5/2013 | Sakurai | |
| 8,470,371 B2 | 6/2013 | Uchegbu et al. | |
| 8,470,420 B2 | 6/2013 | Hiruma et al. | |
| 8,490,259 B2 | 7/2013 | Hartgrove et al. | |
| 8,519,018 B2 | 8/2013 | Patel | |
| 2001/0027237 A1 | 10/2001 | Mayes et al. | |
| 2003/0232088 A1 | 12/2003 | Huang et al. | |
| 2004/0208844 A1 | 10/2004 | Ignatious | |
| 2007/0196644 A1 | 8/2007 | Wu et al. | |
| 2008/0247987 A1 | 10/2008 | Liggins et al. | |
| 2009/0123412 A1 | 5/2009 | Healy et al. | |
| 2009/0208695 A1 | 8/2009 | Funatsu et al. | |
| 2009/0306333 A1 | 12/2009 | Jing et al. | |
| 2010/0112357 A1 | 5/2010 | Fine et al. | |
| 2011/0200784 A1 | 8/2011 | Agarwal et al. | |
| 2011/0245420 A1 | 10/2011 | Rasal et al. | |
| 2011/0313110 A1 | 12/2011 | Inagaki | |
| 2013/0030128 A1 | 1/2013 | He et al. | |
| 2013/0131275 A1 | 5/2013 | Tillman et al. | |
| 2013/0184429 A1 | 7/2013 | Pugh et al. | |

FOREIGN PATENT DOCUMENTS

| | | |
|---|---|---|
| CN | 102229744 A | 11/2011 |
| CN | 102229744 B | 6/2013 |

(Continued)

OTHER PUBLICATIONS

Rzayev, J., "Synthesis of Polystyrene-Polylactide Bottlebrush Copolymers and Their Melt Self Assembly into Large Domain Nanostructures", Macromolecules, 42, 2135-2141, Feb. 2009.*
Shinoda, et al., "Structural Control of Poly(methyl methacrylate)-g-poly(Lactic Acid) Graft Copolymers by Atom Transfer Radical Polymerization (ATRP)", Macromolecules, 34, 2001, 6243-6248, Aug. 3, 2001.*
Xia, et al. "Efficient Synthesis of Narrowly Dispersed Brush Copolymers and Study of Their Assemblies: The Importance of Side Chain Arrangement", Journal of the American Chemical Society, 131, 18525-18532, Nov. 30, 2009.*
Zhao, et al. "Polystrene-Polylactide Bottlebrush Block Copolymers at the Air/Water lnteface", Macromoecules, 42, 9027-9033, Apr. 27, 2009.*
Coulembier, et al. "From Jellyfish Macromolecular Architectures to Nanodoughnut Self-Assembly" Supplemental Information, Macromolecules, 43, 575-579, Dec. 2010.*

(Continued)

*Primary Examiner* — Randy Gulakowski
*Assistant Examiner* — Christopher M Rodd
(74) *Attorney, Agent, or Firm* — Matthew J. Bussan

(57) ABSTRACT

Polylactic acid-backbone graft and bottlebrush copolymers are synthesized by polymerizing a lactide-functionalized macromonomer using ring opening polymerization (ROP). In some embodiments of the present invention, the macromonomer is a lactide-functionalized polymer that may be synthesized by, for example, polymerizing a monomer capable of undergoing radical polymerization (e.g., styrenic, vinylic, acrylic, etc.) using a brominated lactide initiator via atom transfer radical polymerization (ATRP). The brominated lactide initiator may be 3-bromo-3,6-dimethyl-1,4-dioxane-2,5-dione prepared by, for example, reacting lactide with N-bromosuccinimide in the presence of benzoyl peroxide.

4 Claims, 4 Drawing Sheets

(56) References Cited

FOREIGN PATENT DOCUMENTS

| EP | 2634179 A1 | 9/2013 |
|---|---|---|
| JP | 09316310 A | 12/1997 |
| JP | 2004051835 A | 2/2004 |
| JP | 2004285258 A | 10/2004 |
| JP | 2006212897 A | 8/2006 |
| JP | 2009079196 A | 4/2009 |
| JP | 2011032301 A | 2/2011 |
| WO | WO2009099225 A1 | 8/2009 |

OTHER PUBLICATIONS

Hang, Leibniz Fangtinq, "Development of a polylactic acid (PLA) polymer with an acid-sensitive N-ethoxybenzylimidazole (NEBI) crosslinker as a drug delivery system", UC San Diego Electronic Theses and Dissertations, 2012, 127 pages.

Coulembier et al., "From Jellyfish Macromolecular Architectures to Nanodoughnut Self-Assembly", Macromolecules, vol. 43, No. 1, 2010, pp. 575-579.

U.S. Appl. No. 14/243,034, to Boday et al., entitled "Initiation of Controlled Radical Polymerization From Lactide Monomer", filed Apr. 2, 2014, assigned to International Business Machines Corporation.

U.S. Appl. No. 14/243,191, to Boday et al., entitled "Versatile, Facile and Scalable Route to Polylactic Acid-Backbone Graft and Bottlebrush Copolymers", filed Apr. 2, 2014, assigned to International Business Machines Corporation.

List of IBM Patents or Patent Applications Treated as Related.

U.S. Appl. No. 14/519,548, to Boday et al., entitled "Polylactic Acid (PLA) With Low Moisture Vapor Transmission Rates by Grafting Through of Hydrophobic Polymers Directly to PLA Backbone", filed Oct. 21, 2014, assigned to International Business Machines Corporation.

U.S. Appl. No. 14/519,549, to Boday et al., entitled "Flame-Retardant Polylactic Acid (PLA) by Grafting Through of Phosphorus-Containing Polymers Directly to PLA Backbone", filed Oct. 21, 2014, assigned to International Business Machines Corporation.

U.S. Appl. No. 14/526,943, to Boday et al., entitled "Toughened Polylactic Acid (PLA) by Grafting Through of Impact-Modifying Polymers Directly to PLA Backbone", filed Oct. 29, 2014, assigned to International Business Machines Corporation.

Yuan et al., "Inherent flame retardation of bio-based poly(lactic acid) by incorporating phosphorus linked pendent group into the backbone", Polymer Degradation and Stability, vol. 96, 2011, pp. 1669-1675.

Li et al., "DMA Analysis on Bamboo Fiber/Polylactic Acid Composites", Mechanic Automation and Control Engineering (MACE), 2010 International Conference on Mechanic Automation and Control Engineering, 2010, pp. 3090-3092.

English Language Translation of JP10-001580 (1998), 20 pages.

List of IBM Patent or Patent Applications Treated as Related (Updated Oct. 19, 2015).

U.S. Appl. No. 14/833,080, to Boday et al., entitled "Initiation of Controlled Radical Polymerization from Lactide Monomer", filed Aug. 22, 2015, assigned to International Business Machines Corporation.

* cited by examiner

US 9,228,050 B2

VERSATILE, FACILE AND SCALABLE ROUTE TO POLYLACTIC ACID-BACKBONE GRAFT AND BOTTLEBRUSH COPOLYMERS

CROSS-REFERENCE TO RELATED APPLICATION

This patent application is a continuation application of pending U.S. patent application Ser. No. 14/243,191, filed Apr. 2, 2014, entitled "VERSATILE, FACILE AND SCALABLE ROUTE TO POLYLACTIC ACID-BACKBONE GRAFT AND BOTTLEBRUSH COPOLYMERS", which is hereby incorporated herein by reference in its entirety.

BACKGROUND

The present invention relates in general to the field of biobased materials. More particularly, the present invention relates to polylactic acid-backbone graft and bottlebrush copolymers prepared from lactide-functionalized macromonomers using ring opening polymerization (ROP).

SUMMARY

In accordance with some embodiments of the present invention, polylactic acid-backbone graft and bottlebrush copolymers are synthesized by polymerizing a lactide-functionalized macromonomer using ring opening polymerization (ROP). In some embodiments of the present invention, the macromonomer is a lactide-functionalized polymer that may be synthesized by, for example, polymerizing a monomer capable of undergoing radical polymerization (e.g., styrenic, vinylic, acrylic, etc.) using a brominated lactide initiator via atom transfer radical polymerization (ATRP). The brominated lactide initiator may be 3-bromo-3,6-dimethyl-1,4-dioxane-2,5-dione prepared by, for example, reacting lactide with N-bromosuccinimide in the presence of benzoyl peroxide.

BRIEF DESCRIPTION OF THE SEVERAL VIEWS OF THE DRAWINGS

Embodiments of the present invention will hereinafter be described in conjunction with the appended drawings, where like designations denote like elements.

DETAILED DESCRIPTION

Figure 1:
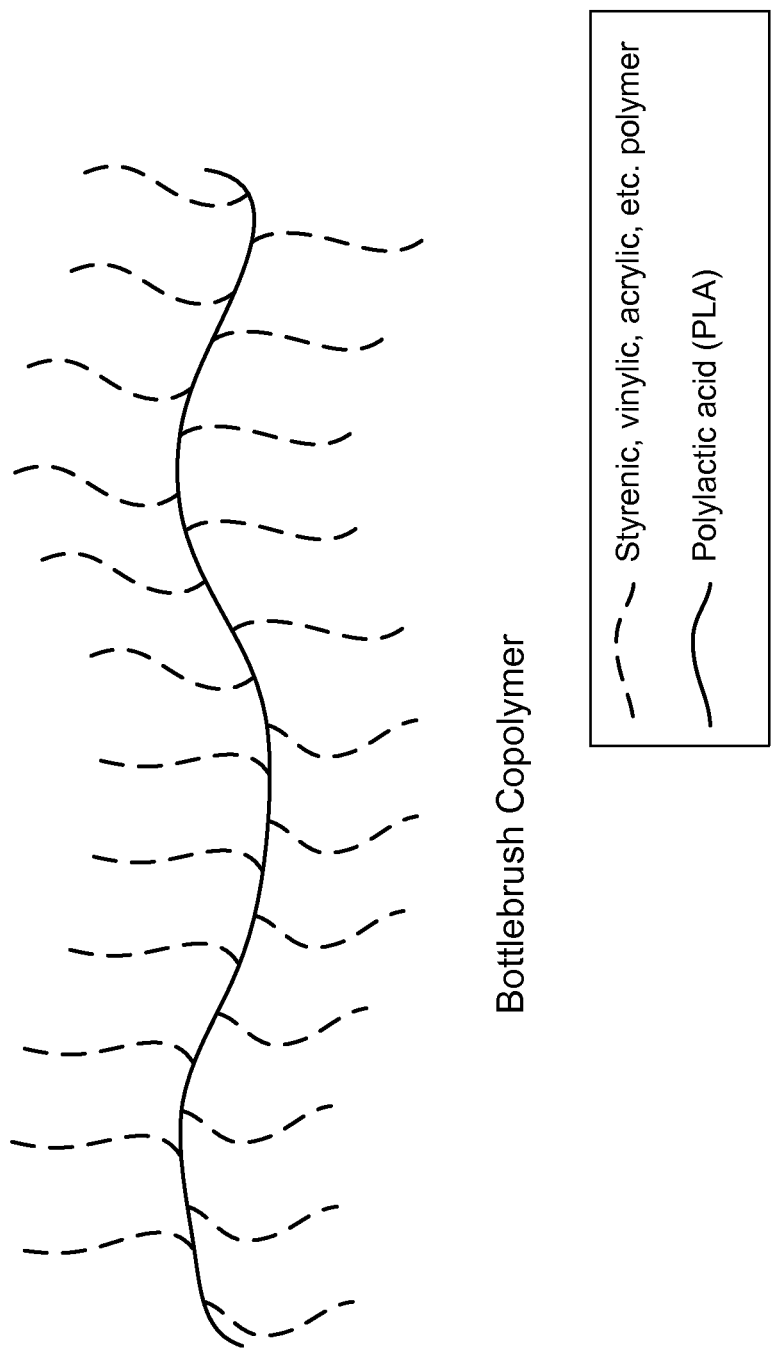
FIG. 1 is a graphical depiction of a bottlebrush copolymer having a polylactic acid-backbone and polymer (e.g., styrenic, vinylic, acrylic, etc.) grafts.

The depletion of fossil fuels from which the majority of polymers are derived, combined with supply chain instability and cost fluctuations of feed chemicals used to make these polymers, is driving the development and utilization of biobased plastics for commodity applications. Polylactic acid (PLA), derived from starch and sugars, is a particularly appealing biobased plastic that is inexpensive and already being produced in large commercial quantities. In comparing polymers' material properties, polystyrene is often considered the petrochemical-based counterpart to PLA. Thus PLA is capable of replacing many petroleum-derived polymers in some applications. However, several of PLA's material properties—such as low heat-distortion temperature, high water adsorption, low flame retardancy, and low toughness—exclude the use of PLA in many applications. Moreover, additives to improve such properties are often expensive and/or come at the cost of sacrificing PLA's beneficial material properties. Hence much effort has been dedicated to directly incorporate chemical functionalities into the backbone of PLA (or PLA's monomer lactide) in order to tailor its properties, but because of the chemical lability of both lactide and PLA, examples of such chemical modification in the prior art typically are complex and low-yielding. A versatile and high-yielding approach to modify either PLA or lactide would greatly expand the profitability of PLA by virtue of its extension to many new end uses.

For purposes of this document, including the claims, the term "lactide" includes all stereoisomers of lactide (e.g., (S,S)-lactide, (R,R)-lactide, and (S,R)-lactide). (S,S)-lactide is also referred to as "L-lactide". (R,R)-lactide is also referred to as "D-lactide". (S,R)-lactide is also referred to as "meso-lactide". A racemic mixture of D-lactide and L-lactide is often referred to as "DL-lactide".

In accordance with some embodiments of the present invention, lactide-functionalized macromonomers are used to form bottlebrush and graft copolymers with PLA backbones. Lactide-functionalized macromonomers utilized in this regard may be lactide-functionalized polymers with a lactide endgroup and a polymer backbone chosen to tailor material properties of the overall copolymer. That is, lactide (PLA's monomer) can be functionalized with a wide array of different polymers designed to engineer specific properties to bottlebrush and graft copolymers. This extends the use of PLA to applications not previously possible and creates new markets for PLA.

Lactide-functionalized macromonomers can be polymerized either alone to form PLA-backbone bottlebrush copolymers (see FIG. 1, described below) or in the presence of non-functionalized lactide to form PLA-backbone graft copolymers (see FIG. 2, described below). PLA-backbone bottlebrush copolymers synthesized in accordance with some embodiments of the present invention have a relatively high density of grafted polymers, while PLA-backbone graft copolymers synthesized in accordance with some embodiments of the present invention have a relatively low density of grafted polymers. PLA-backbone bottlebrush copolymers and PLA-backbone graft copolymers synthesized in accordance with some embodiments of the present invention are well defined and controllable with low polydispersities (e.g., PDI<1.5).

PLA-backbone bottlebrush copolymers and PLA-backbone graft copolymers synthesized in accordance with some embodiments of the present invention constitute chemically-functionalized PLA, and the polymers (e.g., styrenic, vinylic, acrylic, etc.) bonded to the PLA can be strategically chosen to engineer various desired properties in to the overall copolymer. Furthermore, covalent bonding of other polymers to PLA, as in the PLA-backbone bottlebrush and graft copolymers synthesized in accordance with some embodiments of the present invention, has the additional advantage of forming micro- and nano-structured polymers, resulting from phase separation of the two chemically bonded polymeric components. Micro- and nano-scale phase separation of immiscible polymers results in maximized load transfer between the two phases, thereby optimizing the positive effect of the macromonomer on the overall copolymer.

Micro- and nano-structured polymers are formed, in accordance with some embodiments of the present invention, by a simple annealing process (i.e., heating) of the PLA-backbone bottlebrush and graft copolymers. This simple annealing process results in phase separation of the two polymeric components of the PLA-backbone bottlebrush and graft copolymers.

FIG. 1 is a graphical depiction of a bottlebrush copolymer having a polylactic acid-backbone and polymer (e.g., styrenic, vinylic, acrylic, etc.) grafts. In FIG. 1, the PLA-backbone is depicted with a solid line and the grafted polymers are depicted with dashed lines. As noted above, PLA-backbone bottlebrush copolymers synthesized in accordance with some embodiments of the present invention have a relatively high density of grafted polymers.

Figure 2:
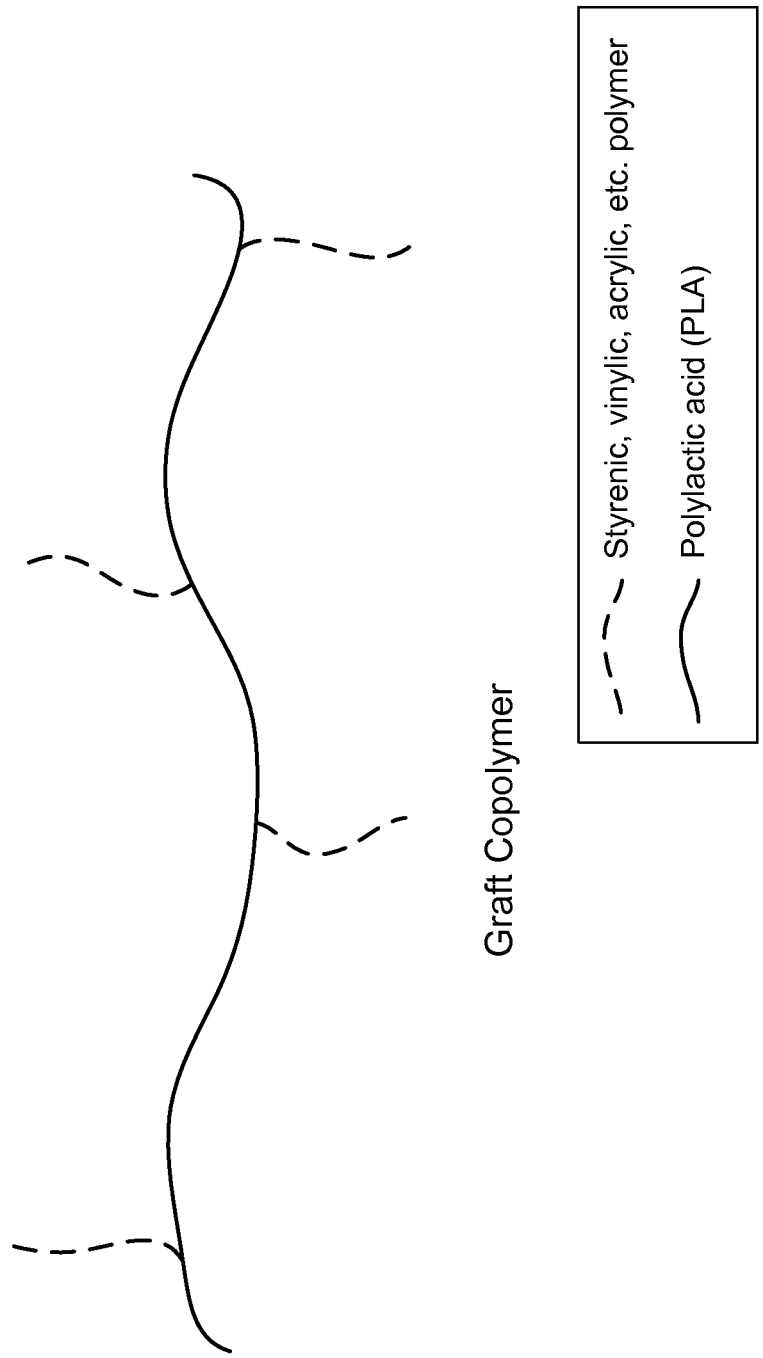
FIG. 2 is graphical depiction of a graft copolymer having a polylactic acid-backbone and polymer (e.g., styrenic, vinylic, acrylic, etc.) grafts.

FIG. 2 is graphical depiction of a graft copolymer having a polylactic acid-backbone and polymer (e.g., styrenic, vinylic, acrylic, etc.) grafts. In FIG. 2, the PLA-backbone is depicted with a solid line and the grafted polymers are depicted with dashed lines. As noted above, PLA-backbone graft copolymers synthesized in accordance with some embodiments of the present invention have a relatively low density of grafted polymers.

The polydispersity index (PDI) is a measure of the distribution of molecular mass in a given polymer sample. PDI is defined as $M_w/M_n$, where $M_w$ is the weight-average molecular weight and $M_n$ is the number-average molecular weight. PLA-backbone bottlebrush copolymers and PLA-backbone graft copolymers synthesized in accordance with some embodiments of the present invention have low PDI (e.g., PDI<1.5).

A simple, two-step method may be employed to chemically modify lactide (PLA's monomer) in such a way that it can be functionalized with a wide array of different polymers designed to engineer specific properties to PLA. Brominated lactide (which may be formed in a one-step process from lactide monomer) can be used directly to initiate polymerization of a variety of monomers through a well-known, often-utilized process called atom-transfer radical polymerization (ATRP). This results in a lactide-functionalized polymer, i.e., a lactide molecule that is functionalized with a polymer. By using lactide as an ATRP-based initiator, it is possible to form well-defined, "living", and low polydispersity index (PDI) polymers. Hence, only two well-defined, high-yielding chemical reactions are required to synthesize a lactide-functionalized polymer.

ATRP is a polymerization technique that is well known to those skilled in the art. ATRP is a controlled "living" free radical polymerization technique. A low concentration of active radicals is maintained to promote slow growth of the molecular weight and, hence, the "living" ATRP process is controlled. Lactide-functionalized polymers synthesized via ATRP are "living" polymers in the same sense. These polymers present no inherent termination mechanism.

In accordance with some embodiments of the present invention, lactide-functionalized polymers are used as macromonomers. Generally, macromonomers are oligomers with a number-average molecular weight $M_n$ between about 1000 and about 10,000 that contain at least one functional group suitable for further polymerization.

A lactide-functionalized polymer may be synthesized by ATRP of a monomer capable of undergoing radical polymerization (e.g., styrenic, vinylic, acrylic, etc.) using 3-bromo-3,6-dimethyl-1,4-dioxane-2,5-dione as a brominated lactide initiator. 3-bromo-3,6-dimethyl-1,4-dioxane-2,5-dione may be prepared by, for example, reacting lactide with N-bromosuccinimide (NBS) in the presence of benzoyl peroxide. One skilled in the art will appreciate, however, that 3-bromo-3,6-dimethyl-1,4-dioxane-2,5-dione may be prepared using any number of methods known to those skilled in the art. For example, 3-bromo-3,6-dimethyl-1,4-dioxane-2,5-dione may be prepared by reacting lactide with bromine ($Br_2$) in the presence of benzoyl peroxide.

Lactide is a commercially available biobased cyclic ester monomer that can be obtained from biomass. Lactide is the cyclic di-ester of lactic acid. Lactide may be prepared by heating lactic acid in the presence of an acid catalyst. Lactide is a solid at room temperature. The melting point temperature of each of L-lactide and D-lactide is between 95 and 97° C. Racemic lactide has a melting point temperature between 116 and 119° C. The melting point temperature of meso-lactide is less than 60° C. (~53° C.).

The brominated lactide initiator, in the presence of a copper (I) and, optionally, copper (II) complex, an appropriate ligand (e.g., N,N,N',N',N-pentamethyldiethylenetriamine (PMDETA)) and a monomer capable of undergoing radical polymerization (e.g., styrenic, vinylic, acrylic, etc.) undergoes an ATRP reaction to form a lactide-functionalized polymer with a polymer backbone (the identity of polymer may be chosen to tailor material properties) and a lactide endgroup capable of, for example, being polymerized through traditional PLA synthetic methods or using as a standalone initiator. As an illustrative example, polymerization of styrene via ATRP may be performed in tetrahydrofuran (THF) at 60-70° C. In this example, the concentration of styrene may be approximately 1.6 M and the ratio of styrene to 3-bromo-3,6-dimethyl-1,4-dioxane-2,5-dione may be approximately 200. Alternatively, the ATRP reaction may be performed in a melt state (e.g., no solvent) using melt polymerization. Melt polymerization techniques are well known in the art.

As noted above, ATRP is a polymerization technique that is well known to those skilled in the art. ATRP can be used with myriad different monomers to produce myriad different polymers without undue experimentation. Generally, polymerization via ATRP is conducted under extremely low steady state concentration of active radicals, allowing propagation of the polymer chain to proceed with suppressed radical-radical coupling. For example, the monomer and initiator may be added to a solution containing a catalytic copper/ligand complex (i.e., an ATRP catalyst and a ligand). Exemplary ATRP catalysts include, but are not limited to, copper(I) complexes such as copper(I) bromide (CuBr) and, optionally, copper(II) complexes such as copper(II) dibromide ($CuBr_2$). Traditional ATRP can be done with added copper (II), but still must have some copper (I) added. Exemplary ligands include, but are not limited to, bipyridines such as 4,4'-dinonyl-2,2'bipyridine (DNBP) and bi-, tri- and tetradentate amines such as N,N,N',N',N-pentamethyldiethylenetriamine (PMDETA).

The catalytic copper/ligand complex may be deoxygenated using known techniques such as successive cycles of freeze-pump-thaw. One skilled in the art will appreciate, however, that other techniques for deoxygenating the mixture may be used in lieu of, or in addition to, successive cycles of freeze-pump-thaw.

The ratio of ATRP catalyst (e.g., CuBr) to monomer (e.g., styrene) can vary, although suitable results are obtained with ratios of 10:1-50:1. The ratio of monomer (e.g., styrene) to initiator (e.g., 3-bromo-3,6-dimethyl-1,4-dioxane-2,5-dione) may also vary, although ratios of about 1:10-1:200 (or more) provide suitable results.

The ATRP synthesis of the lactide-functionalized polymer is performed at an appropriate temperature, for example, 60-70° C. The appropriate temperature can vary, however, depending on a number of factors including, but not limited to, the identity of the monomer, the initiator, the ATRP catalyst, and the ligand, as well as the boiling point of the solvent, if any.

The order of addition of the reagents can have a profound affect on the initiator efficiency. To optimize this, the copper/ligand complex must be formed with a slight excess of copper prior to exposure to the brominated lactide initiator.

PLA-backbone bottlebrush copolymers and PLA-backbone graft copolymers are synthesized, in accordance with some embodiments of the present invention, by using the lactide-functionalized polymer as a macromonomer in a well-known, often-utilized process called ring opening polymerization (ROP). Lactide-functionalized macromonomer is polymerized either alone (Reaction Scheme 1, described below) to form PLA-backbone bottlebrush copolymers or in the presence of lactide (Reaction Scheme 2, described below) to form PLA-backbone graft copolymers. Various catalysts well known in PLA polymerization can be utilized in the polymerization of the lactide-functionalized macromonomer. Exemplary catalysts include, but are not limited to, tin(II) 2-ethylhexanoate ($Sn(Oct)_2$) (also referred to as "stannous octoate" and "tin octoate"), dimethylaminopyridine (DAP), diazabicycloundecene (DBU), and the like.

As noted above, ROP is a polymerization technique that is well known to those skilled in the art. Generally, both metal and metal-free catalysts may be used in ROP polymerizations. The catalyst facilitates a coordination-insertion with the carbonyl portion of the lactide-functionalized macromonomer (and, optionally, lactide if synthesizing a PLA-backbone graft copolymer) and the hydroxyl group of an available alcohol. The ring-opening of the lactide-functionalized macromonomer (and, optionally, lactide if synthesizing a PLA-backbone graft copolymer) by the available alcohol results in the availability of another alcohol for further polymerization.

Reaction Scheme 1, described below, is a general synthetic example of the polymerization to synthesize PLA-backbone bottlebrush copolymers in accordance with some embodiments of the present invention. In the first step of Reaction Scheme 1, brominated lactide monomer 3-bromo-3,6-dimethyl-1,4-dioxane-2,5-dione is prepared by reacting lactide with N-bromosuccinimide (NBS) in the presence of benzoyl peroxide. In the second step of Reaction Scheme 1, a lactide-functionalized polymer is obtained by ATRP of a monomer capable of undergoing radical polymerization (e.g., styrenic, vinylic, acrylic, etc.) initiated from the brominated lactide monomer in the presence of a copper (I) complex/PMDETA. In the third step of Reaction Scheme 1, a PLA-backbone bottlebrush copolymer is obtained by ROP using the lactide-functionalized polymer as a macromonomer.

(Reaction Scheme 1)

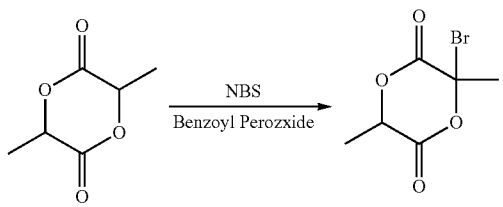

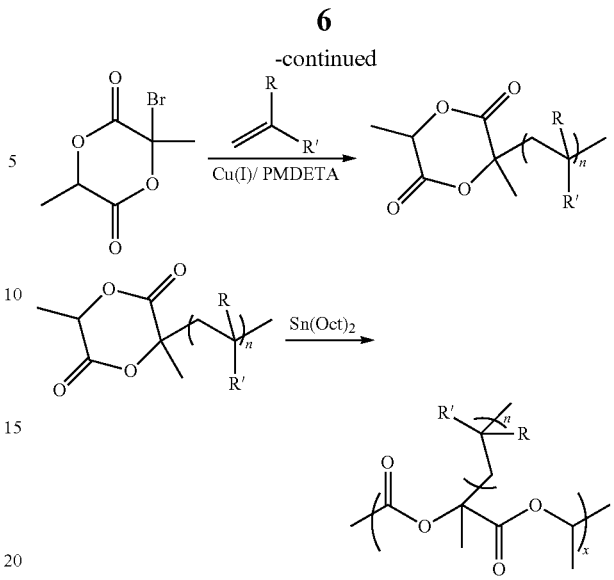

In the second and third steps of Reaction Scheme 1, R is a hydrogen atom or a methyl group, and R' is a phenyl group or C(O)OR", wherein R" is an alkyl group having one or more carbon atoms. Suitable examples of monomers capable of undergoing radical polymerization in the second step of Reaction Scheme 1 include, but are not limited to, styrene, butyl acrylate, methyl acrylate, 2-ethylhexyl acrylate, ethyl acrylate, 2-ethylhexl methacrylate, ethyl methacrylate, butyl methacrylate, and combinations thereof.

Lactide-functionalized polymers (used as macromonomers in the third step of Reaction Scheme 1) may be synthesized using L-lactide as the starting material. In the first step of Reaction Scheme 1, a bromine addition on the L-lactide is employed to synthesize brominated lactide monomer 3-bromo-3,6-dimethyl-1,4-dioxane-2,5-dione. In the second step of Reaction Scheme 1, a monomer capable of undergoing radical polymerization is polymerized via ATRP using the brominated lactide monomer as an initiator.

In the first step of Reaction Scheme 1, a mixture of L-lactide, benzene and N-bromosuccimide (NBS) are added to a three-neck flask and heated to reflux. Generally, stoichiometric amounts of L-lactide and NBS are used. Mechanical stirring is employed throughout reflux. A solution of benzoyl peroxide in benzene is then added dropwise over time through a dropping funnel, syringe or other suitable technique. Generally, any catalytic amount of benzoyl peroxide may be used. One skilled in the art will appreciate that any suitable solvent may be used in these solutions in lieu, or in addition to, benzene. Suitable solvents include, but are not limited to, benzene and acetonitrile. After the monomer is consumed, the reaction mixture is cooled to room temperature. The reaction product, which is brominated lactide monomer 3-bromo-3,6-dimethyl-1,4-dioxane-2,5-dione, may be purified using techniques well known in the art.

In the second step of Reaction Scheme 1, CuBr and N,N,N',N',N-pentamethyldiethylenetriamine (PMDETA) are added to a first flask, along with a magnetic stirrer. The first flask is fitted with a rubber septum and degassed with three successive cycles of freeze-pump-thaw. Generally, the catalytic complex must be formed with a slight excess of copper ($[Cu]_0/[PMDETA]_0 > 1$) before exposure to the lactide initiator. Providing a slight excess of copper prevents undesirable side reactions. To a second flask are added some of the 3-bromo-3,6-dimethyl-1,4-dioxane-2,5-dione prepared in the first step of Reaction Scheme 1, THF, and a monomer capable of undergoing radical polymerization. Generally, the ratio of [monomer]$_0$/[3-bromo-3,6-dimethyl-1,4-dioxane-2,5-dione]$_0$ that may be used ranges from 1:10-1:200 (or more). The second flask is fitted with a rubber septum and degassed by bubbling with N$_2$ flow for at least 30 minutes. This mixture is then transferred into the first flask and the polymerization is carried out under stirring at a suitable temperature. Polymerization typically occurs over a period of hours. Generally, the polymerization of the monomer via ATRP may be performed in THF at 60-70° C. The reaction product, which is lactide-functionalized polymer 3-poly(monomer)-3,6-dimethyl-1,4-dioxane-2,5-dione, may be purified using techniques well known in the art.

One skilled in the art will appreciate that any suitable catalytic complex may be used in lieu, or in addition to, CuBr/PMDETA catalytic complex. Suitable catalytic complexes include both a suitable ATRP catalyst and a suitable ligand. Suitable ATRP catalysts include, but are not limited to, copper(I) complexes such as CuBr or other copper halides. Suitable ligands include, but are not limited to, bipyridines and bi-, tri- and tetradentate amines. Specific examples of suitable ligands include 4,4'-dinonyl-2,2'bipyridine (DNBP), N,N,N',N',N-pentamethyldiethylenetriamine (PMDETA), and 1,1,4,7,10,10-hexamethyltriethylenetetramine (HMTETA).

In the third step of Reaction Scheme 1, a solution of stannous octoate (Sn(Oct)$_2$) in anhydrous toluene and a solution of benzyl alcohol in anhydrous toluene are added to a flask, and the solvent is removed in vacuo. Generally, any catalytic amount of Sn(Oct)$_2$ or other suitable catalyst may be used. A similar amount of benzyl alcohol or other suitable initiator is typically used. One skilled in the art will appreciate that any suitable solvent may be used in the Sn(Oct)2 solution and benzyl alcohol solution in lieu, or in addition to, anhydrous toluene. Some of the lactide-functionalized polymer (macromonomer) prepared in the second step of Reaction Scheme 1 is added to the flask, along with a magnetic stirrer. The flask is fitted with a rubber septum and degassed by bubbling with N$_2$ flow for at least 30 minutes. The polymerization is carried out under stirring at a suitable temperature. Polymerization typically occurs over a period of hours. Generally, the polymerization of the lactide-functionalized macromonomer via ROP may be performed in toluene at 110° C. Alternatively, the ROP reaction may be performed in a melt state (e.g., no solvent) at 110-180° C. using melt polymerization. Melt polymerization techniques are well known in the art. The reaction product, which is a PLA-backbone bottlebrush copolymer, may be purified using techniques well known in the art.

One skilled in the art will appreciate that any suitable catalyst may be used in lieu, or in addition to, Sn(Oct)$_2$. Generally, both metal and metal-free catalysts may be used. Suitable catalysts include, but are not limited to, Sn(Oct)$_2$, dimethylaminopyridine (DAP), 1,8-diazabicycloundec-7-ene (DBU), and 1,5,7-triazabicyclo[4.4.0]dec-5-ene (TBD).

One skilled in the art will appreciate that any initiator may be used in lieu, or in addition to, benzyl alcohol. Suitable initiators include, but are not limited to, benzyl alcohol, primary alcohols (e.g., ethanol and butanol), 2-hydroxyethyl acrylate, and 2-hydroxyethyl methacrylate.

Reaction Scheme 2, described below, is a general synthetic example of the polymerization to synthesize PLA-backbone graft copolymers in accordance with some embodiments of the present invention. In the first step of Reaction Scheme 2, brominated lactide monomer 3-bromo-3,6-dimethyl-1,4-dioxane-2,5-dione is prepared by reacting lactide with N-bromosuccinimide (NBS) in the presence of benzoyl peroxide. In the second step of Reaction Scheme 2, a lactide-functionalized polymer is obtained by ATRP of a monomer capable of undergoing radical polymerization (e.g., styrenic, vinylic, acrylic, etc.) initiated from the brominated lactide monomer in the presence of a copper (I) complex/PMDETA. In the third step of Reaction Scheme 2, a PLA-backbone graft copolymer is obtained by ROP using and the lactide-functionalized polymer as a macromonomer and non-functionalized lactide.

(Reaction Scheme 2)

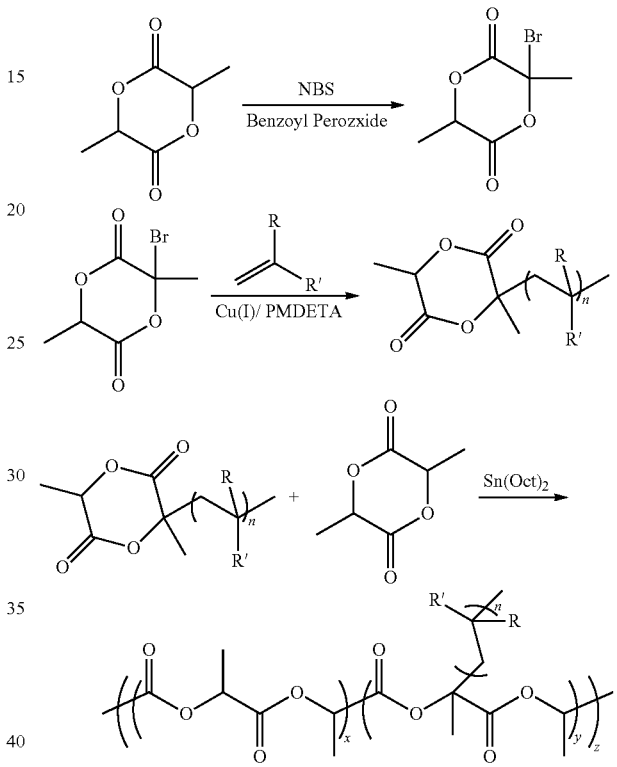

In the second and third steps of Reaction Scheme 2, R is a hydrogen atom or a methyl group, and R' is a phenyl group or C(O)OR'', wherein R'' is an alkyl group having one or more carbon atoms. Suitable examples of monomers capable of undergoing radical polymerization in the second step of Reaction Scheme 2 include, but are not limited to, styrene, butyl acrylate, methyl acrylate, 2-ethylhexyl acrylate, ethyl acrylate, 2-ethylhexl methacrylate, ethyl methacrylate, butyl methacrylate, and combinations thereof.

Lactide-functionalized polymers (used as macromonomers in the third step of Reaction Scheme 2) may be synthesized using L-lactide as the starting material. In the first step of Reaction Scheme 2, a bromine addition on the L-lactide is employed to synthesize brominated lactide monomer 3-bromo-3,6-dimethyl-1,4-dioxane-2,5-dione. In the second step of Reaction Scheme 2, a monomer capable of undergoing radical polymerization is polymerized via ATRP using the brominated lactide monomer as an initiator.

In the first step of Reaction Scheme 2, a mixture of L-lactide, benzene and N-bromosuccinimide (NBS) are added to a three-neck flask and heated to reflux. Generally, stoichiometric amounts of L-lactide and NBS are used. Mechanical stirring is employed throughout reflux. A solution of benzoyl peroxide in benzene is then added dropwise over time through a dropping funnel, syringe or other suitable technique. Generally, any catalytic amount of benzoyl peroxide may be used. One skilled in the art will appreciate that any suitable solvent may be used in these solutions in lieu, or in addition to, benzene. Suitable solvents include, but are not limited to, benzene and acetonitrile. After the monomer is consumed, the reaction mixture is cooled to room temperature. The reaction product, which is brominated lactide monomer 3-bromo-3,6-dimethyl-1,4-dioxane-2,5-dione, may be purified using techniques well known in the art.

In the second step of Reaction Scheme 2, CuBr and N,N,N',N',N-pentamethyldiethylenetriamine (PMDETA) are added to a first flask, along with a magnetic stirrer. The first flask is fitted with a rubber septum and degassed with three successive cycles of freeze-pump-thaw. Generally, the catalytic complex must be formed with a slight excess of copper ($[Cu]_0/[PMDETA]_0 > 1$) before exposure to the lactide initiator. Providing a slight excess of copper prevents undesirable side reactions. To a second flask are added some of the 3-bromo-3,6-dimethyl-1,4-dioxane-2,5-dione prepared in the first step of Reaction Scheme 2, THF, and a monomer capable of undergoing radical polymerization. Generally, the ratio of $[monomer]_0/[3\text{-bromo-}3,6\text{-dimethyl-}1,4\text{-dioxane-}2,5\text{-dione}]_0$ that may be used ranges from 1:10-1:200 (or more). The second flask is fitted with a rubber septum and degassed by bubbling with $N_2$ flow for a few minutes. This mixture is then transferred into the first flask and the polymerization is carried out under stirring at a suitable temperature. Polymerization typically occurs over a period of hours. Generally, the polymerization of the monomer via ATRP may be performed in THF at 60-70° C. The reaction product, which is lactide-functionalized polymer 3-poly(monomer)-3,6-dimethyl-1,4-dioxane-2,5-dione, may be purified using techniques well known in the art.

One skilled in the art will appreciate that any suitable catalytic complex may be used in lieu, or in addition to, CuBr/PMDETA catalytic complex. Suitable catalytic complexes include both a suitable ATRP catalyst and a suitable ligand. Suitable ATRP catalysts include, but are not limited to, copper(I) complexes such as CuBr or other copper halides. Suitable ligands include, but are not limited to, bipyridines and bi-, tri- and tetradentate amines. Specific examples of suitable ligands include 4,4'-dinonyl-2,2'bipyridine (DNBP), N,N,N',N',N-pentamethyldiethylenetriamine (PMDETA), and 1,1,4,7,10,10-hexamethyltriethylenetetramine (HMTETA).

In the third step of Reaction Scheme 2, a solution of stannous octoate ($Sn(Oct)_2$) in anhydrous toluene and a solution of benzyl alcohol in anhydrous toluene are added to a flask, and the solvent is removed in vacuo. Generally, any catalytic amount of $Sn(Oct)_2$ or other suitable catalyst may be used. A similar amount of benzyl alcohol or other suitable initiator is typically used. One skilled in the art will appreciate that any suitable solvent may be used in the Sn(Oct)2 solution and benzyl alcohol solution in lieu, or in addition to, anhydrous toluene. Some of the lactide-functionalized polymer (macromonomer) prepared in the second step of Reaction Scheme 2 and non-functionalized lactide are added to the flask, along with a magnetic stirrer. Generally, the amount of lactide-functionalized macromonomer relative to the amount of non-functionalized lactide may be adjusted to achieve a desired density of grafted polymers. The flask is fitted with a rubber septum and degassed by bubbling with $N_2$ flow for at least 30 minutes. The polymerization is carried out under stirring at a suitable temperature. Polymerization typically occurs over a period of hours. Generally, the polymerization of the lactide-functionalized macromonomer and non-functionalized lactide via ROP may be performed in toluene at 110° C. Alternatively, the ROP reaction may be performed in a melt state (e.g., no solvent) at 110-180° C. using melt polymerization. Melt polymerization techniques are well known in the art. The reaction product, which is a PLA-backbone graft copolymer, may be purified using techniques well known in the art.

One skilled in the art will appreciate that any suitable catalyst may be used in lieu, or in addition to, $Sn(Oct)_2$. Generally, both metal and metal-free catalysts may be used. Suitable catalysts include, but are not limited to, $Sn(Oct)_2$, dimethylaminopyridine (DAP), 1,8-diazabicycloundec-7-ene (DBU), and 1,5,7-triazabicyclo[4.4.0]dec-5-ene (TBD).

One skilled in the art will appreciate that any initiator may be used in lieu, or in addition to, benzyl alcohol. Suitable initiators include, but are not limited to, benzyl alcohol, primary alcohols (e.g., ethanol and butanol), 2-hydroxyethyl acrylate, and 2-hydroxyethyl methacrylate.

Prophetic Example 1

Figure 3:
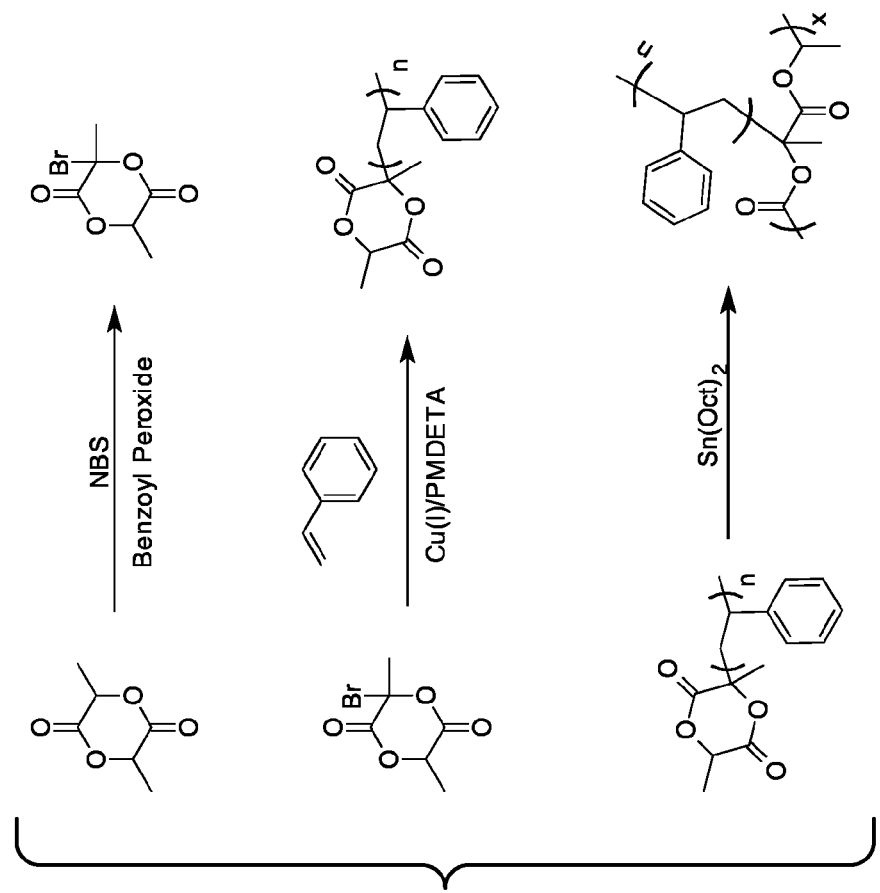
FIG. 3 is a chemical reaction diagram showing the preparation of a polylactic acid-backbone bottlebrush copolymer from the lactide-functionalized polymer 3-poly(styrene)-3,6-dimethyl-1,4-dioxane-2,5-dione using ring opening polymerization in accordance with some embodiments of the present invention.

Synthesis of PLA-g-polystyrene bottlebrush copolymer via ROP using 3-poly(styrene)-3,6-dimethyl-1,4-dioxane-2,5-dione as a macromonomer In this prophetic example, PLA-g-polystyrene bottlebrush copolymer is synthesized using lactide-functionalized polymer 3-poly(styrene)-3,6-dimethyl-1,4-dioxane-2,5-dione as a macromonomer. For this synthesis, as illustrated in FIG. 3, a bromine addition on the L-lactide is employed to synthesize brominated lactide monomer 3-bromo-3,6-dimethyl-1,4-dioxane-2,5-dione, followed by polymerization of styrene via ATRP using the brominated lactide monomer as an initiator to form the lactide-functionalized macromonomer, followed by polymerization of the lactide-functionalized macromonomer via ROP to form the PLA-g-polystyrene bottlebrush copolymer.

Synthesis of 3-bromo-3,6-dimethyl-1,4-dioxane-2,5-dione

To a 1 L three-neck flask are added L-lactide (100.0 g, 0.694 mol), benzene (500 mL) and N-bromosuccimide (NBS) (136.0 g, 0.764 mmol). The mixture is heated to reflux (approximately 80° C.). Mechanical stirring is employed throughout reflux.

A solution of benzoyl peroxide (3.36 g, 13.9 mmol) in benzene (50 mL) is then added dropwise through a dropping funnel over 20 minutes.

After the monomer is consumed, the reaction mixture is cooled to room temperature. Then, filtration is employed to separate the solid filtride from the liquid filtrate.

The solid filtride from the filtration is evaporated to dryness forming a pale yellow solid. The solid is dissolved in dichloromethane (750 mL) and the solution is washed with saturated sodium bisulfate solution three times and saturated NaCl solution once. The organic layer is dried over $MgSO_4$, and the solution is evaporated to dryness. The orange solid is recrystallized from ethyl acetate and hexanes to produce 68.9 g of white crystals. One skilled in the art will appreciate that recrystallization may be performed in other suitable solutions.

The liquid filtrate from the filtration is evaporated to dryness, and the solid is recrystallized from ethyl acetate and hexanes to produce 27.1 g of white crystals. Here too, one skilled in the art will appreciate that recrystallization may be performed in other suitable solutions.

The combined yield (from both the solid filtride and the liquid filtrate) is 96.1. g (62%).

Synthesis of 3-poly(styrene)-3,6-dimethyl-1,4-dioxane-2,5-dione

To a first flask are added CuBr (70.5 mg, 0.49 mmol) and N,N,N',N',N-pentamethyldiethylenetriamine (PMDETA) (77.5 mg, 0.45 mmol), as well as a magnetic stirrer. The first flask is fitted with a rubber septum and degassed with three successive cycles of freeze-pump-thaw. Generally, the catalytic complex must be formed with a slight excess of copper ($[Cu]_0/[PMDETA]_0>1$) before exposure to the lactide initiator. Providing a slight excess of copper prevents undesirable side reactions.

To a second flask are added some of the 3-bromo-3,6-dimethyl-1,4-dioxane-2,5-dione (99.7 mg, 0.45 mmol) prepared in the first step of this example, THF (10 mL), and styrene (5 mL, 43.64 mmol). Generally, the ratio of $[styrene]_0/[3\text{-bromo-3,6-dimethyl-1,4-dioxane-2,5-dione}]_0$ that may be used ranges from 10 to 200. The second flask is fitted with a rubber septum and degassed by bubbling with $N_2$ flow for at least 30 minutes. This mixture is then transferred into the first flask and the polymerization is carried out under stirring at 70° C. Polymerization occurs over a period of 0.5-4 hours. Generally, the polymerization of styrene via ATRP may be performed in THF at 60-70° C. for a $[styrene]_0$ of 0.5-5 M and $[styrene]_0/[3\text{-bromo-3,6-dimethyl-1,4-dioxane-2,5-dione}]_0$ of 10-200.

Copper catalyst is removed by passing the reaction mixture diluted with THF through an alumina gel column.

The 3-poly(styrene)-3,6-dimethyl-1,4-dioxane-2,5-dione is recovered by precipitation in 7-fold excess of cold methanol, filtrated and dried up to constant weight.

Synthesis of PLA-g-polystyrene bottlebrush copolymer

A solution of stannous octoate ($Sn(Oct)_2$) in anhydrous toluene (0.01 mL of 0.05 M solution) and a solution of benzyl alcohol in anhydrous toluene (0.1 mL of 0.04 M solution) are added to a flask, and the solvent is removed in vacuo. Some of the lactide-functionalized polymer (macromonomer) (2 g, 0.4 mmol) prepared in the second step of this example is added to the flask, along with a magnetic stirrer. The flask is fitted with a rubber septum and degassed by bubbling with $N_2$ flow for at least 30 minutes. The polymerization is carried out under stirring at 110° C. Polymerization occurs over a period of 5 hours. Generally, the polymerization of the lactide-functionalized macromonomer via ROP may be performed in toluene at 110° C. or in the melt at 110-180° C.

The crude PLA-g-polystyrene bottlebrush copolymer is dissolved in chloroform ($CHCl_3$), recovered by precipitation in cold methanol, filtrated, and dried up to constant weight.

Prophetic Example 2

Figure 4:
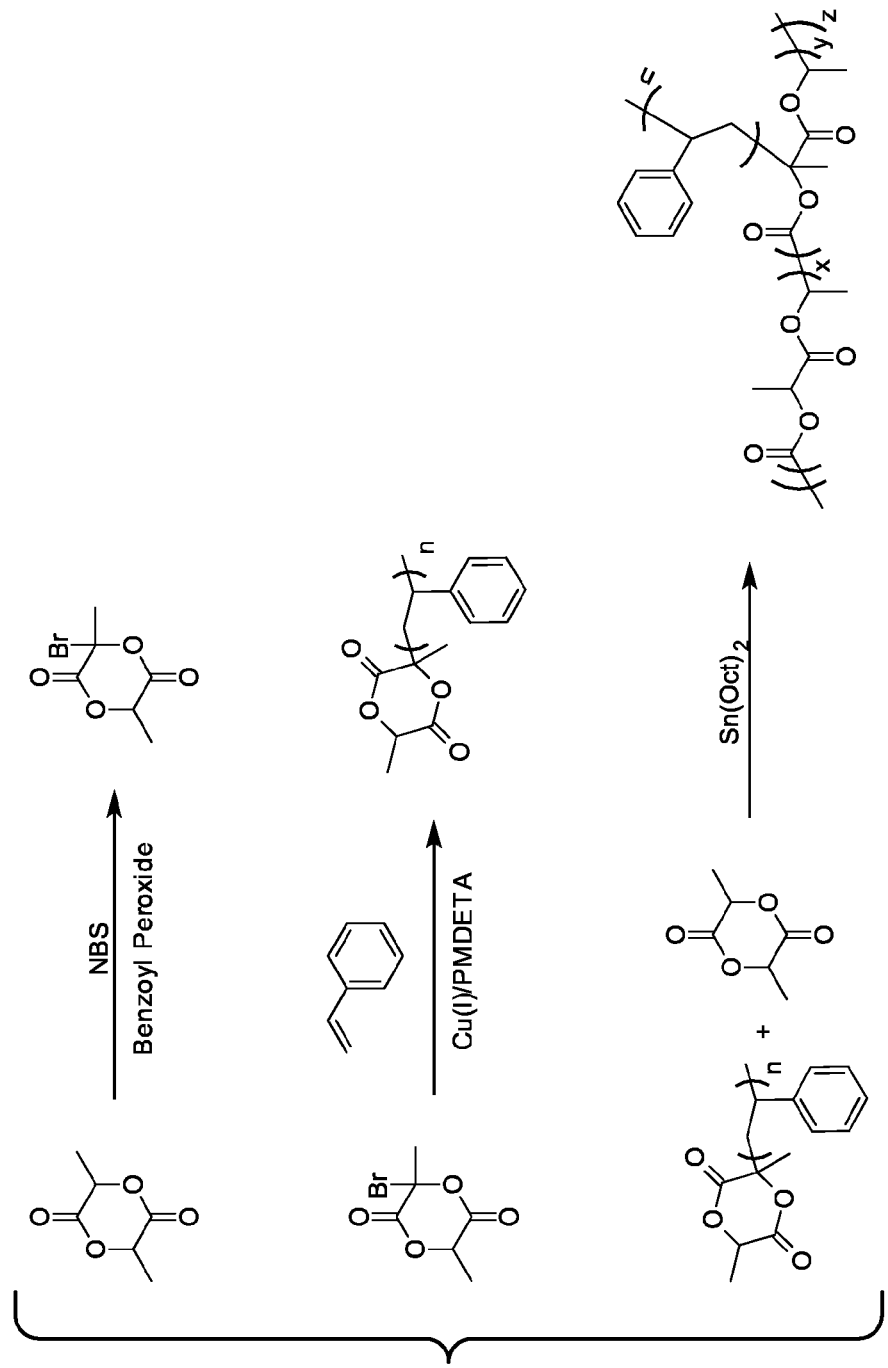
FIG. 4 is a chemical reaction diagram showing the preparation of a polylactic acid-backbone graft copolymer from lactide-functionalized polymer 3-poly(styrene)-3,6-dimethyl-1,4-dioxane-2,5-dione and non-functionalized lactide using ring opening polymerization (ROP) in accordance with some embodiments of the present invention.

Synthesis of PLA-g-polystyrene graft copolymer via ROP using 3-poly(styrene)-3,6-dimethyl-1,4-dioxane-2,5-dione as a macromonomer together with non-functionalized lactide In this prophetic example, PLA-g-polystyrene graft copolymer is synthesized using lactide-functionalized polymer 3-poly(styrene)-3,6-dimethyl-1,4-dioxane-2,5-dione as a macromonomer together with non-functionalized lactide. For this synthesis, as illustrated in FIG. 4, a bromine addition on the L-lactide is employed to synthesize brominated lactide monomer 3-bromo-3,6-dimethyl-1,4-dioxane-2,5-dione, followed by polymerization of styrene via ATRP using the brominated lactide monomer as an initiator to form the lactide-functionalized macromonomer, followed by polymerization of the lactide-functionalized macromonomer and non-functionalized lactide via ROP to form the PLA-g-polystyrene graft copolymer.

Synthesis of 3-bromo-3,6-dimethyl-1,4-dioxane-2,5-dione

To a 1 L three-neck flask are added L-lactide (100.0 g, 0.694 mol), benzene (500 mL) and N-bromosuccimide (NBS) (136.0 g, 0.764 mmol). The mixture is heated to reflux (approximately 80° C.). Mechanical stirring is employed throughout reflux.

A solution of benzoyl peroxide (3.36 g, 13.9 mmol) in benzene (50 mL) is then added dropwise through a dropping funnel over 20 minutes.

After the monomer is consumed, the reaction mixture is cooled to room temperature. Then, filtration is employed to separate the solid filtride from the liquid filtrate.

The solid filtride from the filtration is evaporated to dryness forming a pale yellow solid. The solid is dissolved in dichloromethane (750 mL) and the solution is washed with saturated sodium bisulfate solution three times and saturated NaCl solution once. The organic layer is dried over $MgSO_4$, and the solution is evaporated to dryness. The orange solid is recrystallized from ethyl acetate and hexanes to produce 68.9 g of white crystals. One skilled in the art will appreciate that recrystallization may be performed in other suitable solutions.

The liquid filtrate from the filtration is evaporated to dryness, and the solid is recrystallized from ethyl acetate and hexanes to produce 27.1 g of white crystals. Here too, one skilled in the art will appreciate that recrystallization may be performed in other suitable solutions.

The combined yield (from both the solid filtride and the liquid filtrate) is 96.1. g (62%).

Synthesis of 3-poly(styrene)-3,6-dimethyl-1,4-dioxane-2,5-dione

To a first flask are added CuBr (70.5 mg, 0.49 mmol) and N,N,N',N',N-pentamethyldiethylenetriamine (PMDETA) (77.5 mg, 0.45 mmol), as well as a magnetic stirrer. The first flask is fitted with a rubber septum and degassed with three successive cycles of freeze-pump-thaw. Generally, the catalytic complex must be formed with a slight excess of copper ($[Cu]_0/[PMDETA]_0>1$) before exposure to the lactide initiator. Providing a slight excess of copper prevents undesirable side reactions.

To a second flask are added some of the 3-bromo-3,6-dimethyl-1,4-dioxane-2,5-dione (99.7 mg, 0.45 mmol) prepared in the first step of this example, THF (10 mL), and styrene (5 mL, 43.64 mmol). Generally, the ratio of $[styrene]_0/[3\text{-bromo-3,6-dimethyl-1,4-dioxane-2,5-dione}]_0$ that may be used ranges from 10 to 200. The second flask is fitted with a rubber septum and degassed by bubbling with $N_2$ flow for at least 30 minutes. This mixture is then transferred into the first flask and the polymerization is carried out under stirring at 70° C. Polymerization occurs over a period of 0.5-4 hours. Generally, the polymerization of styrene via ATRP may be performed in THF at 60-70° C. for a $[styrene]_0$ of 0.5-5 M and $[styrene]_0/[3\text{-bromo-3,6-dimethyl-1,4-dioxane-2,5-dione}]_0$ of 10-200.

Copper catalyst is removed by passing the reaction mixture diluted with THF through an alumina gel column.

The 3-poly(styrene)-3,6-dimethyl-1,4-dioxane-2,5-dione is recovered by precipitation in 7-fold excess of cold methanol, filtrated and dried up to constant weight.

Synthesis of PLA-g-polystyrene graft copolymer

A solution of stannous octoate (Sn(Oct)$_2$) in anhydrous toluene (0.01 mL of 0.05 M solution) and a solution of benzyl alcohol in anhydrous toluene (0.1 mL of 0.04 M solution) are added to a flask, and the solvent is removed in vacuo. Some of the lactide-functionalized polymer (macromonomer) (0.056 g, 0.01 mmol) prepared in the second step of this example and non-functionalized lactide (0.056 g, 0.39 mmol) are added to the flask, along with a magnetic stirrer. The flask is fitted with a rubber septum and degassed by bubbling with N$_2$ flow for at least 30 minutes. The polymerization is carried out under stirring at 110° C. Polymerization occurs over a period of 5 hours. Generally, the polymerization of the lactide-functionalized macromonomer and the non-functionalized lactide via ROP may be performed in toluene at 110° C. or in the melt at 110-180° C.

The crude PLA-g-polystyrene graft copolymer is dissolved in chloroform (CHCl$_3$), recovered by precipitation in cold methanol, filtrated, and dried up to constant weight.

One skilled in the art will appreciate that many variations are possible within the scope of the present invention. Thus, while the present invention has been particularly shown and described with reference to preferred embodiments thereof, it will be understood by those skilled in the art that these and other changes in form and details may be made therein without departing from the spirit and scope of the present invention.

What is claimed is:

1. A polylactic acid-backbone graft copolymer represented by the following formula:

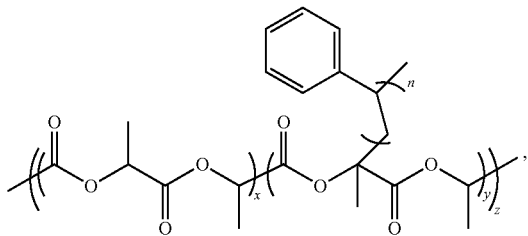

wherein variables x, y, z and n each denotes a degree of polymerization of a respective repeating unit, wherein the value of the variable n is sufficient to provide the repeating unit associated with the variable y with a number-average molecular weight $M_n$ between about 1000 and about 10,000, and wherein x, y, and z are equal to 1 or greater.

2. A polylactic acid-backbone bottlebrush copolymer represented by the following formula:

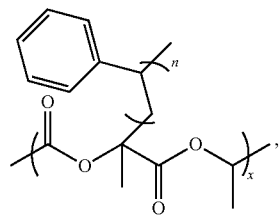

wherein variables x and n each denotes a degree of polymerization of a respective repeating unit, wherein the value of the variable n is sufficient to provide the repeating unit associated with the variable x with a number-average molecular weight $M_n$ between about 1000 and about 10,000, and wherein x is greater than 1.

3. The polylactic acid-backbone graft copolymer as recited in claim 1, wherein the polylactic acid-backbone graft copolymer is synthesized by a method comprising:

polymerizing a lactide-functionalized macromonomer using ring opening polymerization (ROP) and lactide, wherein the lactide-functionalized macromonomer is 3-poly(styrene)-3,6-dimethyl-1,4-dioxane-2,5-dione.

4. The polylactic acid-backbone bottlebrush copolymer as recited in claim 2, wherein the polylactic acid-backbone bottlebrush copolymer is synthesized by a method comprising:

polymerizing a lactide-functionalized macromonomer using ring opening polymerization (ROP), wherein the lactide-functionalized macromonomer is 3-poly(styrene)-3,6-dimethyl-1,4-dioxane-2,5-dione.

* * * * *